(12) United States Patent
Nakatani

(10) Patent No.: US 8,333,896 B2
(45) Date of Patent: Dec. 18, 2012

(54) COMPONENT SEPARATION DEVICE, METHOD OF MANUFACTURING THE SAME, AND METHOD OF SEPARATING COMPONENTS USING THE SAME

(75) Inventor: Masaya Nakatani, Hyogo (JP)

(73) Assignee: Panasonic Corporation, Osaka (JP)

( * ) Notice: Subject to any disclaimer, the term of this patent is extended or adjusted under 35 U.S.C. 154(b) by 1878 days.

(21) Appl. No.: 10/543,835

(22) PCT Filed: Nov. 25, 2004

(86) PCT No.: PCT/JP2004/017455
§ 371 (c)(1), (2), (4) Date: Jul. 29, 2005

(87) PCT Pub. No.: WO2005/058459
PCT Pub. Date: Jun. 30, 2005

(65) Prior Publication Data
US 2006/0124555 A1 Jun. 15, 2006

(30) Foreign Application Priority Data
Dec. 17, 2003 (JP) .................................. 2003-419198

(51) Int. Cl.
*C02F 1/34* (2006.01)
(52) U.S. Cl. ................................. 210/748.05
(58) Field of Classification Search ................. 210/748, 210/748.05
See application file for complete search history.

(56) References Cited

U.S. PATENT DOCUMENTS

| | | | | |
|---|---|---|---|---|
| 5,324,349 A | * | 6/1994 | Sano et al. | 106/31.25 |
| 5,679,724 A | * | 10/1997 | Sacripante et al. | 523/161 |
| 6,164,933 A | * | 12/2000 | Tani et al. | 417/413.2 |
| 6,179,413 B1 | * | 1/2001 | Coulman et al. | 347/63 |
| 6,351,057 B1 | | 2/2002 | Kim | |
| 6,419,348 B1 | * | 7/2002 | Kojima et al. | 347/72 |
| 7,003,857 B1 | * | 2/2006 | Shimada et al. | 29/25.35 |
| 7,074,842 B2 | * | 7/2006 | Chung et al. | 523/160 |
| 7,114,797 B2 | * | 10/2006 | Junhua | 347/71 |
| 7,198,754 B2 | | 4/2007 | Kasahara et al. | |
| 2002/0051039 A1 | * | 5/2002 | Moynihan et al. | 347/68 |
| 2002/0051042 A1 | * | 5/2002 | Takagi et al. | 347/72 |
| 2003/0112300 A1 | * | 6/2003 | Chung et al. | 347/71 |
| 2004/0008241 A1 | * | 1/2004 | Junhua | 347/70 |

FOREIGN PATENT DOCUMENTS

| | | |
|---|---|---|
| CN | 1262529 A | 8/2000 |
| CN | 1410548 A | 4/2003 |
| JP | 09277531 | * 10/1997 |
| JP | 2001-525722 | 12/2001 |
| JP | 2002-048071 | 2/2002 |
| WO | WO 98/50133 | 11/1998 |

* cited by examiner

OTHER PUBLICATIONS

Chinese Office Action issued in Chinese Patent Application No. CN 2004-800053836, dated May 11, 2007.

*Primary Examiner* — Bobby Ramdhanie
(74) *Attorney, Agent, or Firm* — McDermott Will & Emery LLP

(57) ABSTRACT

A component separation device includes a substrate having a flow path formed therein and arranged to store a fluid containing a liquid component and a solid component, and an actuator causing the fluid stored in the flow path to vibrate. The actuator includes a first electrode provided on the substrate apart from the flow path, and a first piezoelectric member provided on the first electrode, and a second electrode provided on the first piezoelectric member. This separation device prevents the actuator from being contaminated by the fluid, and separates the components efficiently.

15 Claims, 8 Drawing Sheets

COMPONENT SEPARATION DEVICE, METHOD OF MANUFACTURING THE SAME, AND METHOD OF SEPARATING COMPONENTS USING THE SAME

This application is a U.S. national phase application of PCT international application PCT/JP2004/017455.

TECHNICAL FIELD

The present invention relates to a component separation device for separating components from fluid including a liquid component and a solid component mixed therein, such as blood or emulsion, a method of manufacturing the device, and a method of separating components using the device.

BACKGROUND OF THE INVENTION

Fluid mixed with plural solid components, such as river water, sea water, or blood, are known. This fluid is mixture of liquid component and solid components. The solid components, such as sand, bacteria, or blood corpuscle cells, exist as solid substances by precipitation or dispersion while not being dissolved in the liquid component.

As a method of separating the plural components, a device for separating blood corpuscle from blood will be described. Blood is generally sampled as whole blood including blood plasma as the liquid component, blood corpuscle cells as the solid components, and other components. However, either only the blood corpuscle cell or only the blood plasma is often required for examining the blood.

For example, in order to examine a blood sugar level in blood, it is necessary to measure blood sugar dissolved in a blood plasma. In order to detect DNA, DNA is taken out from a white blood corpuscle cell in blood corpuscle. Therefore, in order to separate blood plasma and blood corpuscle components from whole blood sampled by a conventional method, the whole blood is put in a test tube, and a predetermined centrifugal force is applied to it with a centrifugal machine. The components in the whole blood in the test tube receive respective centrifugal forces corresponding to the components, thereby being separated by the difference of their masses.

Then, the blood plasma component is obtained by extracting supernatant fluid, and the blood corpuscle component is obtained from precipitate. Then, the separated components are subjected to predetermined measurements in an examination process.

The conventional method using the centrifugal machine has the following problem. This method requires a certain amount of the sample, for example, several milliliters to several tens milliliters of the whole blood in the test tube. By this method, it is difficult to separate the liquid component or the solid component from a small amount of the sample.

A method of separating the solid component from a small amount of sample using a filter is disclosed in "Integrated vertical screen micro-filter system using inclined SU-8 structure" (Yong-Kyu Yoon, MEMS2003, Kyoto, pp. 227-230 published by IEEE). A porous filter filters blood corpuscles having sizes larger than a predetermined size, thereby separating blood corpuscles from a blood plasma component. In this method, the size and the number of pores of the filter affect its separation characteristics. Therefore, the filter is designed optimally to the component to be separated. For example, a meshed filter can be manufactured precisely regarding the size and the number of the pores of the filter by exposing a light sensitive resist three-dimensionally.

In this conventional method employing the filter, the particle size of the solid component passing through the filter depends on a pressure applied to fluid or powder fluid containing plural components mixed therein passing through the filter. The solid component particles, particularly having plural sizes, are hardly separated by this method. In order to take out the predetermined particles, the sizes of the pores of the filters are determined to allow particles smaller than the predetermined particles to pass through the pores. The predetermined particles are trapped by the filter, and thus, may clog the pores of the filter, thereby preventing small particles from passing through.

Japanese Patent Laid-Open Publication No. 2001-525722 discloses a device for performing manipulation of particles suspended in fluid. This device includes a duct for allowing a fluid containing particles suspended therein to flow, an ultrasonic transducer provided at a side of the duct, and a reflector provided at another side of the duct. The ultrasonic transducer is provided on a side surface of a flow path of the duct. The ultrasonic transducer contacts the inside of the duct. In this device, an acoustic standing wave which passes across the duct in its width direction is generated, and thereby, condenses the particles to form one or more planer bands extending in parallel with the vertical axis of the duct, thereby separating the particles, i.e., solid components, from liquid component.

In this device, the acoustic standing wave allows the particles to concentrate at predetermined positions in the fluid, and it is not necessary to be anxious about clogging of a filter. However, since contacting the inside of the duct, the ultrasonic transducer may be contaminated by the fluid in the duct. Since the ultrasonic transducer forms a part of the duct, the duct is necessarily formed of flat surfaces, hence causing a vibration surface of the ultrasonic transducer to be a plane surface. Therefore, acoustic waves generated by the transducer are limited to plane waves. It is difficult to install an ultrasonic actuator precisely to the side surface of the duct.

SUMMARY OF INVENTION

A component separation device includes a substrate having a flow path formed therein and arranged to store a fluid containing a liquid component and a solid component, and an actuator causing the fluid stored in the flow path to vibrate. The actuator includes a first electrode provided on the substrate apart from the flow path, and a first piezoelectric member provided on the first electrode, and a second electrode provided on the first piezoelectric member.

This separation device prevents the actuator from being contaminated by the fluid, and separates the components efficiently.

REFERENCE NUMERALS

1 Substrate
2 Flow Path
3 Actuator
5 Common Electrode
6A Piezoelectric Member
6B Piezoelectric Member
7A Drive Electrode
7B Drive Electrode
8 Inlet Port
9 Outlet Port
10A Through-Hole
10B Through-Hole
11 Solid Component
12 Liquid Component
13 Resist Mask
14 Resist Mask
15 Resist Mask
16 Actuator
18 Electrode Layer
19 Piezoelectric Layer
20 Electrode Layer
26 Substrate
27 Flow Path
28 Actuator
29 Inlet Port
30 Outlet Port

DETAIL DESCRIPTION OF THE PREFERRED EMBODIMENTS

Exemplary Embodiment 1

Figure 1:
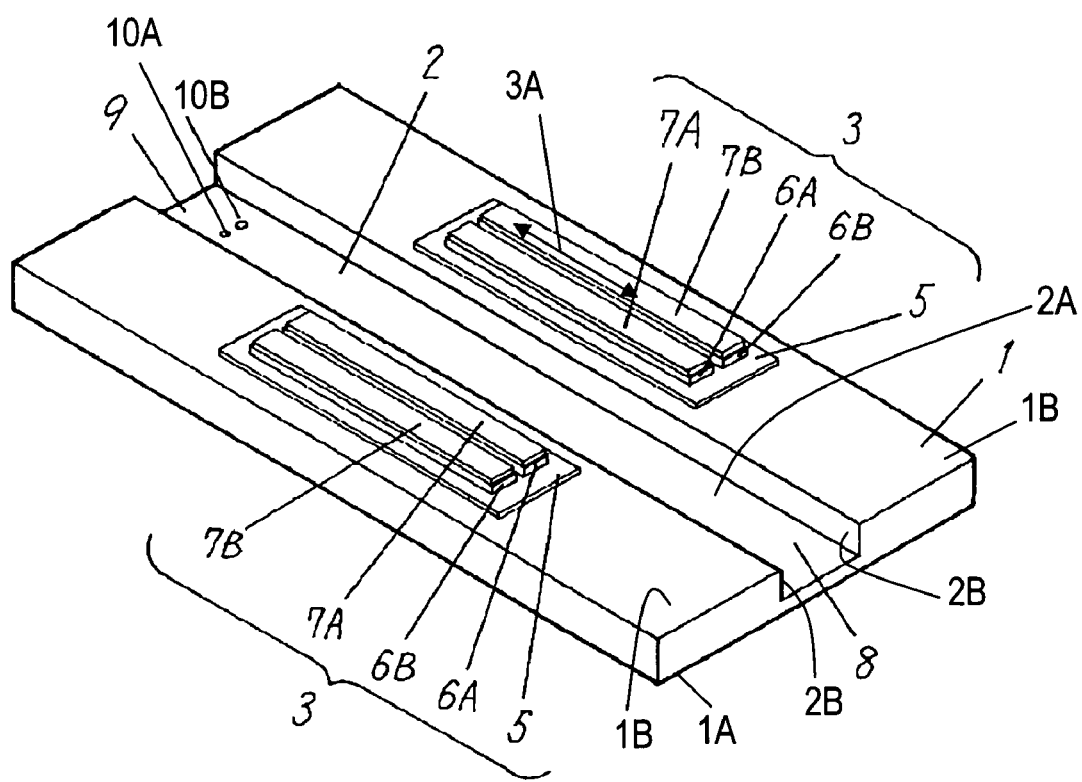
FIG. 1 is a perspective view of a component separation device according to Exemplary Embodiment 1 of the present invention.

FIG. 1 is a perspective view of a component separation device according to Exemplary Embodiment 1 of the present invention. Flow path 2 is formed in substrate 1 made of silicon. Fluid containing a solid component and a liquid component mixed therein is put in inlet port 8 and discharged from the outside of the device, and flows out from outlet port 9 via flow path 2. That is, the fluid is stored in flow path 2. Through-holes 10A and 10B are formed in bottom surface 2A of flow path 2 to reach surface 1A opposite to bottom surface 2A. Actuator 3 having longitudinal direction 3A is provided on upper surface 1B of substrate 1 apart from flow path 2. Longitudinal direction 3A of actuator 3 is parallel with side surface 2B of flow path 2. Actuator 3 includes common electrode 5 of platinum provided on substrate 1, piezoelectric members 6A and 6B of titanate acid zirconate provided on common electrode 5, and drive electrode 7A of gold provided on piezoelectric member 6A, and drive electrode 7B of gold provided on piezoelectric member 6B. Common electrode 5 and drive electrodes 7A and 7B may include at least one of gold, chrome, titanium, and platinum. Actuator 3 generates a large magnitude of vibration efficiently with a low voltage even having a small size.

Since longitudinal direction 3A of actuator 3 extends in parallel with side surface 2B of flow path 2 continuing to surface 1B, actuator 3 generates the vibration efficiently, as described later. Device shown in FIG. 1 includes two actuators 3 at the outside of respective side surfaces of flow path 2, however, may include a single actuator for generating the vibration.

Figure 2:
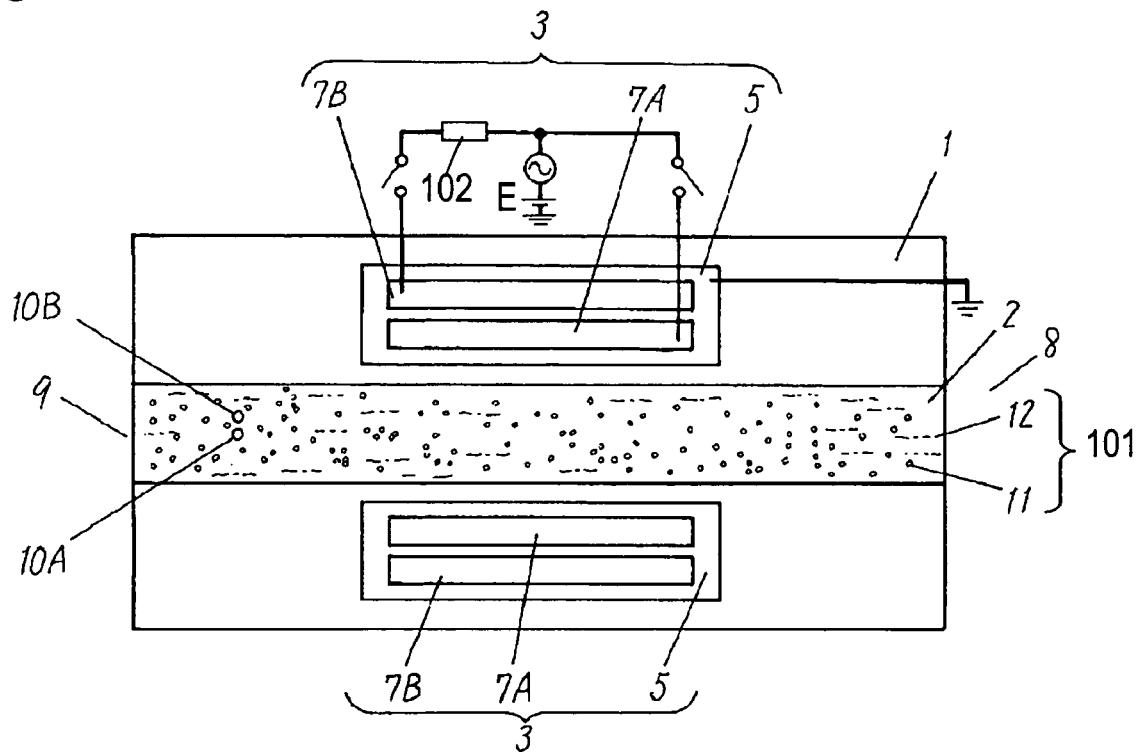
FIG. 2 is a top view of the component separation device according to Embodiment 1.
Figure 3:
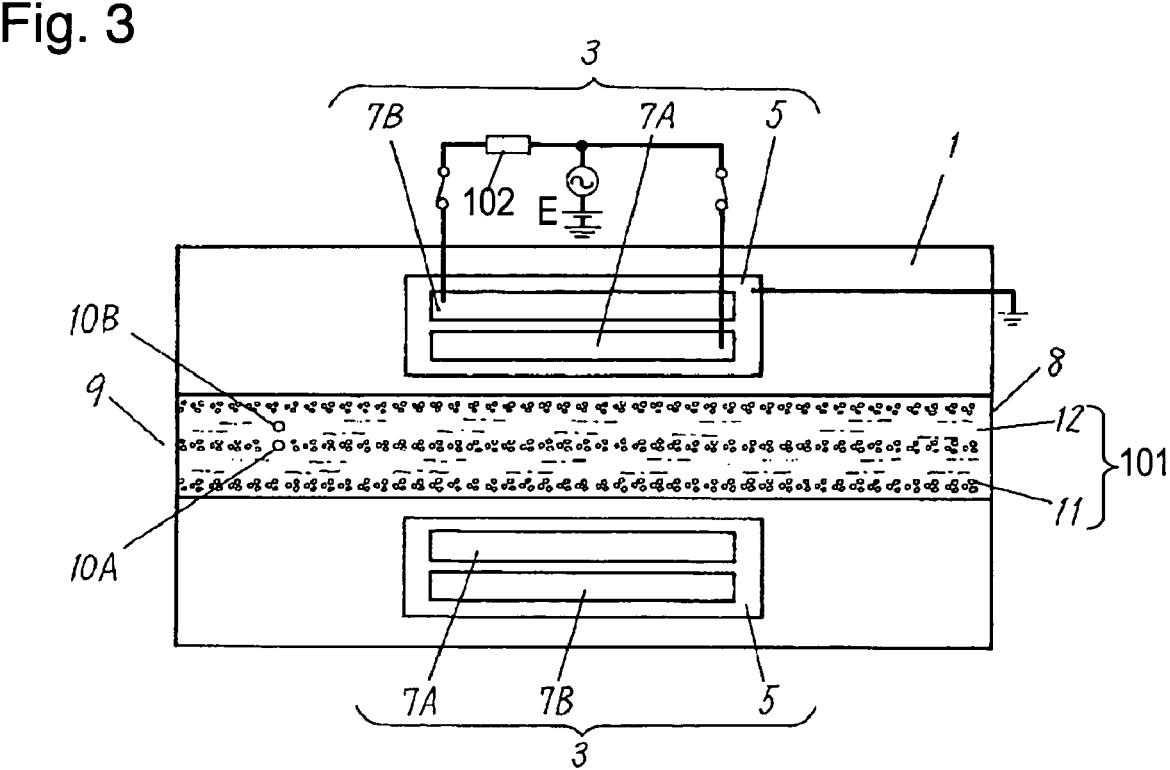
FIG. 3 is a top view of the component separation device according to Embodiment 1.

A method of separating solid component and liquid component from fluid including the components mixed therein with using this component separation device will be described. FIGS. 2 and 3 are top views of the component separation device.

First, fluid 101 containing solid component 11 and liquid component 12 mixed therein is put into inlet port 8. Fluid 101 fills flow path 2, and then, flow out from outlet port 9. Solid component 11 and liquid component 12 of fluid 101 flow randomly when nothing is applied to them, as shown in FIG. 2.

Figure 4:
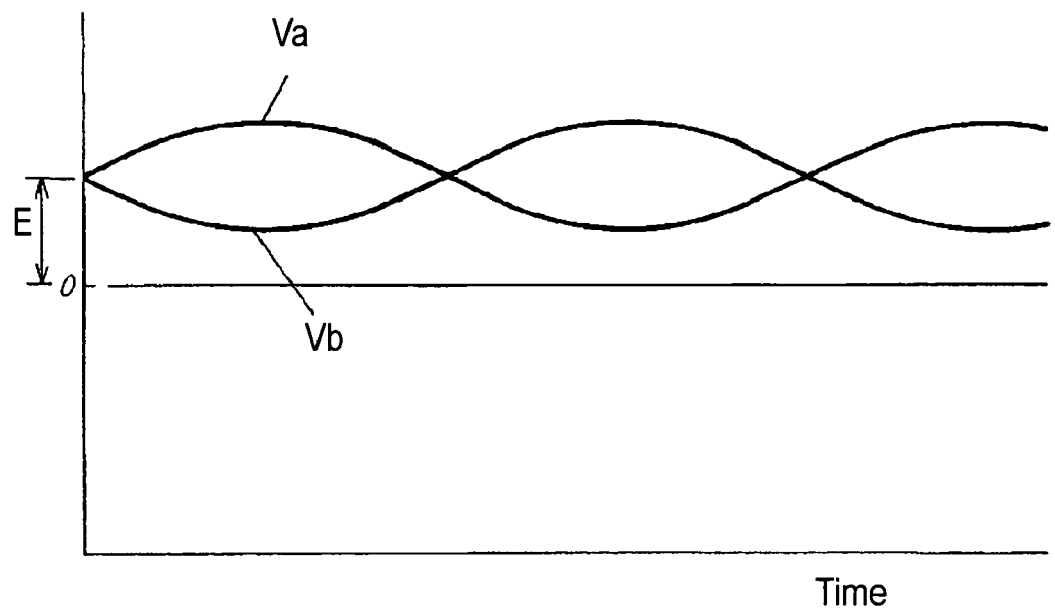
FIG. 4 shows a voltage to be applied to an actuator of the component separation device according to Embodiment 1.

A high-frequency voltage oscillating at a predetermined frequency is applied to actuator 3. Common electrode 5 is maintained at a predetermined potential, such as 0V. FIG. 3 shows a circuit connected to actuator 3, and FIG. 4 shows high-frequency voltages Va and Vb applied to drive electrodes 7A and 7B, respectively. 180-degree-phase shifter 102 causes high-frequency voltages Va and Vb to shift each other in phase by 180 degrees. High-frequency voltages Va and Vb causes piezoelectric members 6A and 6B to vibrate, i.e., to expand and contract repetitively, respectively, and the vibrations are transmitted to substrate 1 and reach flow path 2. High-frequency voltages Va and Vb are preferably biased by bias voltage E from a DC power source, as shown in FIG. 4, so that a voltage between piezoelectric member 6A and common electrode 5 is not inverted, and a voltage between piezoelectric member 6B and common electrode 5 is not inverted. This operation prevents piezoelectric members 6A and 6B from polarization relaxation due to application of inversed voltages, thus driving them stably and preventing deterioration of their characteristics. DC bias voltage E may be either positive or negative as long as the voltage between piezoelectric member 6A and common electrode 5 is not inverted and the voltage between piezoelectric member 6B and common electrode 5 is not inverted.

In flow path 2, a standing wave of vibration is generated under predetermined conditions of the shape of flow path 2 and the frequency of the vibration. When the standing wave is generated in flow path 2, as shown in FIG. 3, solid component 11 concentrates at nodes of the standing waves, and flows in flow path 2 to form lines. FIG. 3 schematically shows solid component 11 flowing in flow path 2 while concentrating at three nodes of the standing wave.

Through-hole 10A of substrate 1 is provided below a position where solid component 11 flows intensively. Fluid 101 is drawn to the lower side of substrate 1 from through-hole 10A, and solid component 11 can be obtained with a small amount of liquid component 12 from through-hole 10A. Through-hole 10B of substrate 1 is provided at a position other than the position where solid component 11 flows intensively. Only liquid component 12 can be obtained by drawing fluid 101 from through-hole 10B. Through-holes 10A and 10B function as a component outlet for taking out solid component 11 and liquid component 12 from fluid 101, respectively. When only one of solid component 11 and liquid component 12, for example, only solid component 11 is required, it is not necessary to form through-hole 10B corresponding to the other component, that is, liquid component 12. The sizes and the number of through-holes 10A and 10B are not necessarily designed uniquely for separating specific blood plasma and blood corpuscle, thus allowing this device to be used comprehensively.

Figure 5:
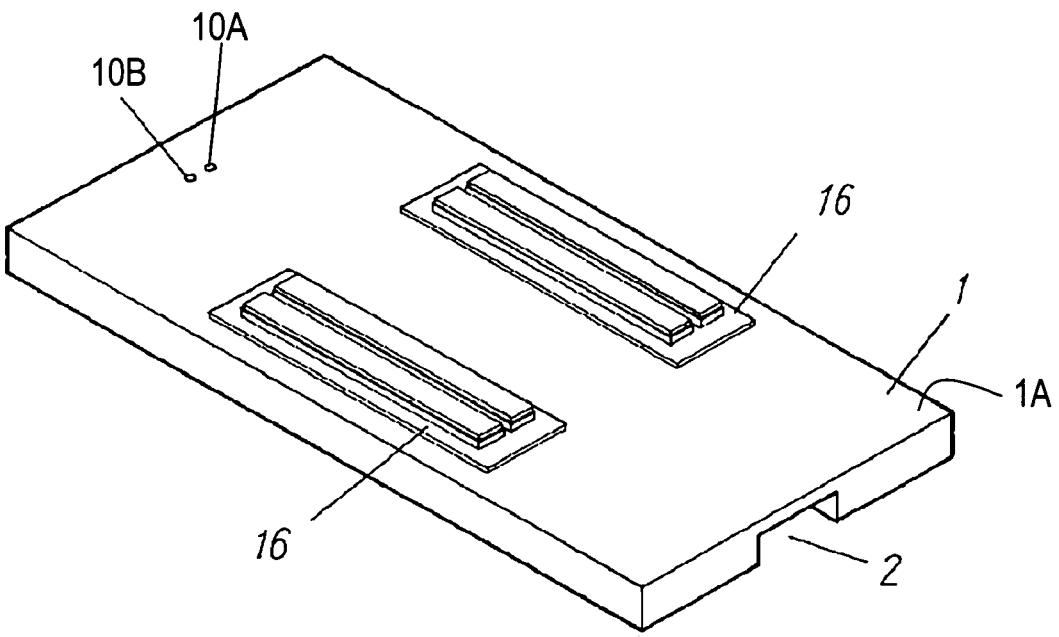
FIG. 5 is a perspective view of another component separation device according to Embodiment 1.

FIG. 5 is a perspective view of another component separation device according to Embodiment 1. As shown in FIG. 5, actuator 16 may be provided on lower surface 1A of substrate 1. Actuator 16 can be provided below flow path 2 on lower surface 1A, thereby transmitting its vibration efficiently.

A method of manufacturing the component separation device according to Embodiment 1 shown in FIG. 1 will be described. FIG. 6 to FIG. 12 are cross-sectional views of the component separation device for illustrating processes for manufacturing the device.

Figure 6:
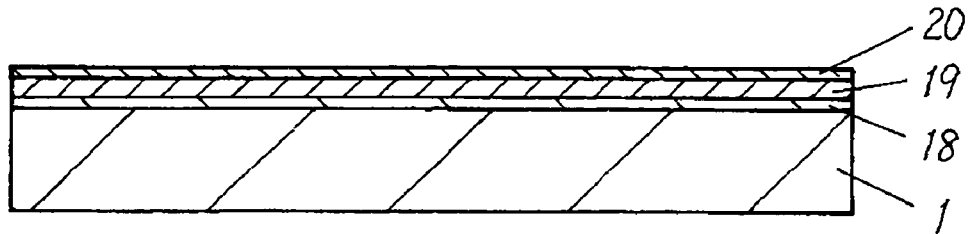
FIG. 6 is a cross-sectional view of the component separation device for illustrating processes for manufacturing the device according to Embodiment 1.

First, as shown in FIG. 6, electrode layer 18 made of platinum is formed on substrate 1 made of silicon. Piezoelectric layer 19 made of titanic acid zirconate is formed on electrode layer 18. Electrode layer 20 made of gold is formed on piezoelectric layer 19. Electrode layers 18 and 20 are formed by an ordinary method, such as vacuum evaporation or spattering. Piezoelectric layer 19 made of titanic acid zirconate can be formed by spattering process, hydrothermal synthesis, or sol-gel process. Piezoelectric layer 19 formed particularly by the spattering process is displaced stably with an excellent piezoelectric characteristics.

Figure 7:
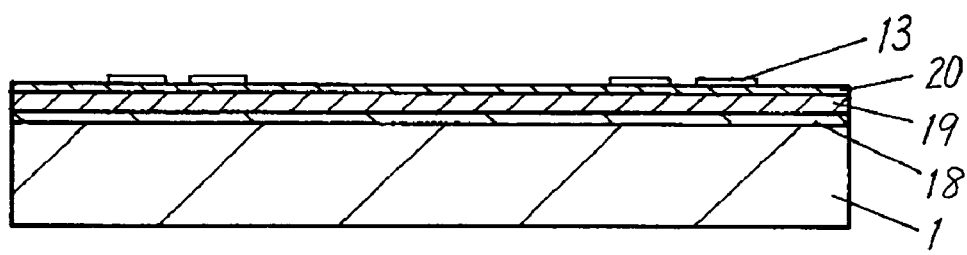
FIG. 7 is a cross-sectional view of the component separation device for illustrating the processes for manufacturing the device according to Embodiment 1.
Figure 8:
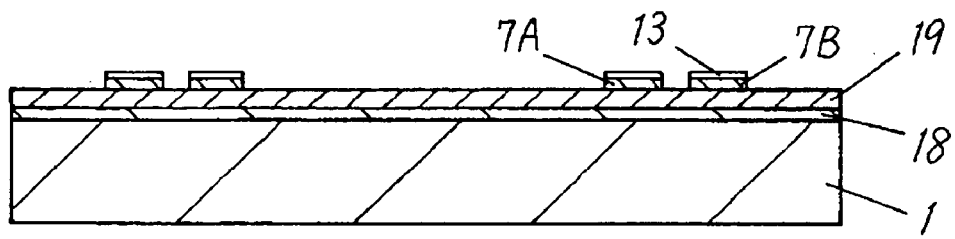
FIG. 8 is a cross-sectional view of the component separation device for illustrating the processes for manufacturing the device according to Embodiment 1.
Figure 9:
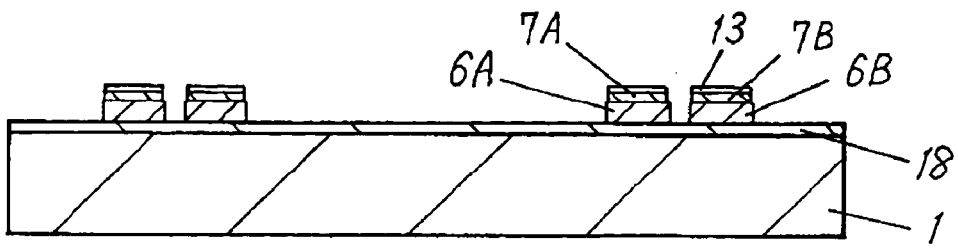
FIG. 9 is a cross-sectional view of the component separation device for illustrating the processes for manufacturing the device according to Embodiment 1.

Next, resist mask 13 having a predetermined pattern is formed on electrode layer 20, as shown in FIG. 7. Then, as shown in FIG. 8, electrode layer 20 is etched to provide drive electrodes 7A and 7B separated from each other. Then, as shown in FIG. 9, piezoelectric layer 19 made of titanic acid zirconate is etched to form piezoelectric members 6A and 6B separated from each other. Then, resist mask 13 is removed.

Figure 10:
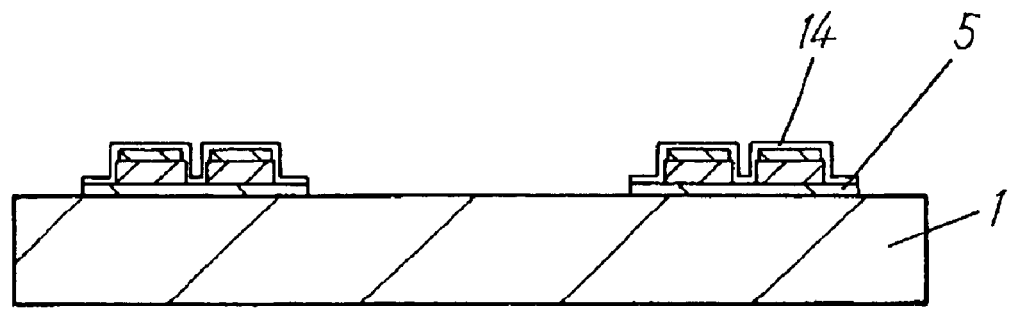
FIG. 10 is a cross-sectional view of the component separation device for illustrating the processes for manufacturing the device according to Embodiment 1.

Next, as shown in FIG. 10, resist mask 14 having a predetermined pattern is provided on electrodes 7A and 7B and on electrode layer 18, and electrode layer 18 is etched to form common electrode 5. Resist mask 14 is removed after the etching.

Figure 11:
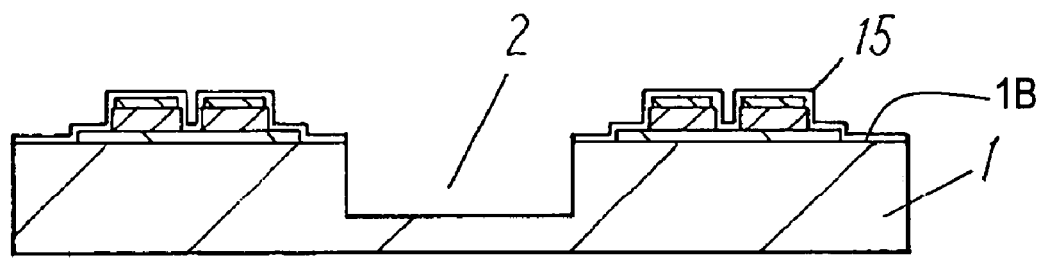
FIG. 11 is a cross-sectional view of the component separation device for illustrating the processes for manufacturing the device according to Embodiment 1.

Then, as shown in FIG. 11, resist mask 15 having a predetermined pattern is formed on electrodes 7A and 7B, on electrode layer 18, and on upper surface 1B of substrate 1. Then, substrate 1 is etched to form flow path 2 having inlet port 8 and outlet port 9 in substrate 1 of silicon. Then, resist mask 15 is removed. Substrate 1 made of silicone is etched by a dry etching process to have a fine shape accurately. Dry etching with mixed gas containing gas for facilitating the etching and gas for restraining the etching processes substrate 1 accurately, thereby allowing the device to have a small size.

Figure 12:
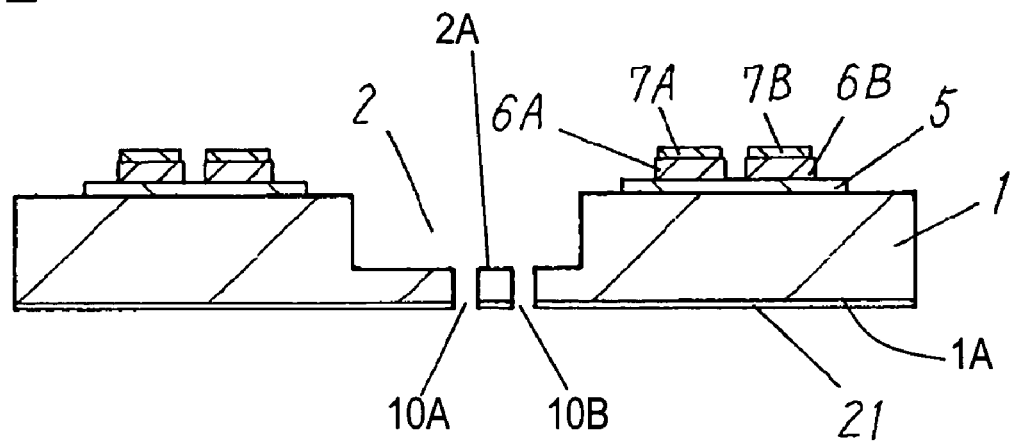
FIG. 12 is a cross-sectional view of the component separation device for illustrating the processes for manufacturing the device according to Embodiment 1.

Then, as shown in FIG. 12, resist mask 21 having a predetermined pattern is formed on lower surface 1A of substrate 1, and then, substrate 1 is etched to form through-holes 10A and 10B in the bottom of flow path 2. Resist mask 21 is removed after the etching, thus providing the component separation device according to Embodiment 1.

Since actuator 3 is provided on the upper surface of substrate 1, plural component separation devices can be obtained at once from a single wafer efficiently by the above method similarly to a semiconductor process.

Actuators 3 and 16 do not contact the fluid in flow path 2, hence being prevented from being contaminated by the fluid. Each of actuators 3 and 16 has longitudinal direction 3A extending in parallel with side surface 2B of flow path 2. The device according to Embodiment 1 can generate vibration in flow path 2 adequately without loss, thereby separating components efficiently.

In order to manufacture the component separation device shown in FIG. 5, the electrode layers and the piezoelectric layer are formed under lower surface 1A of substrate 1.

Exemplary Embodiment 2

Figure 13:
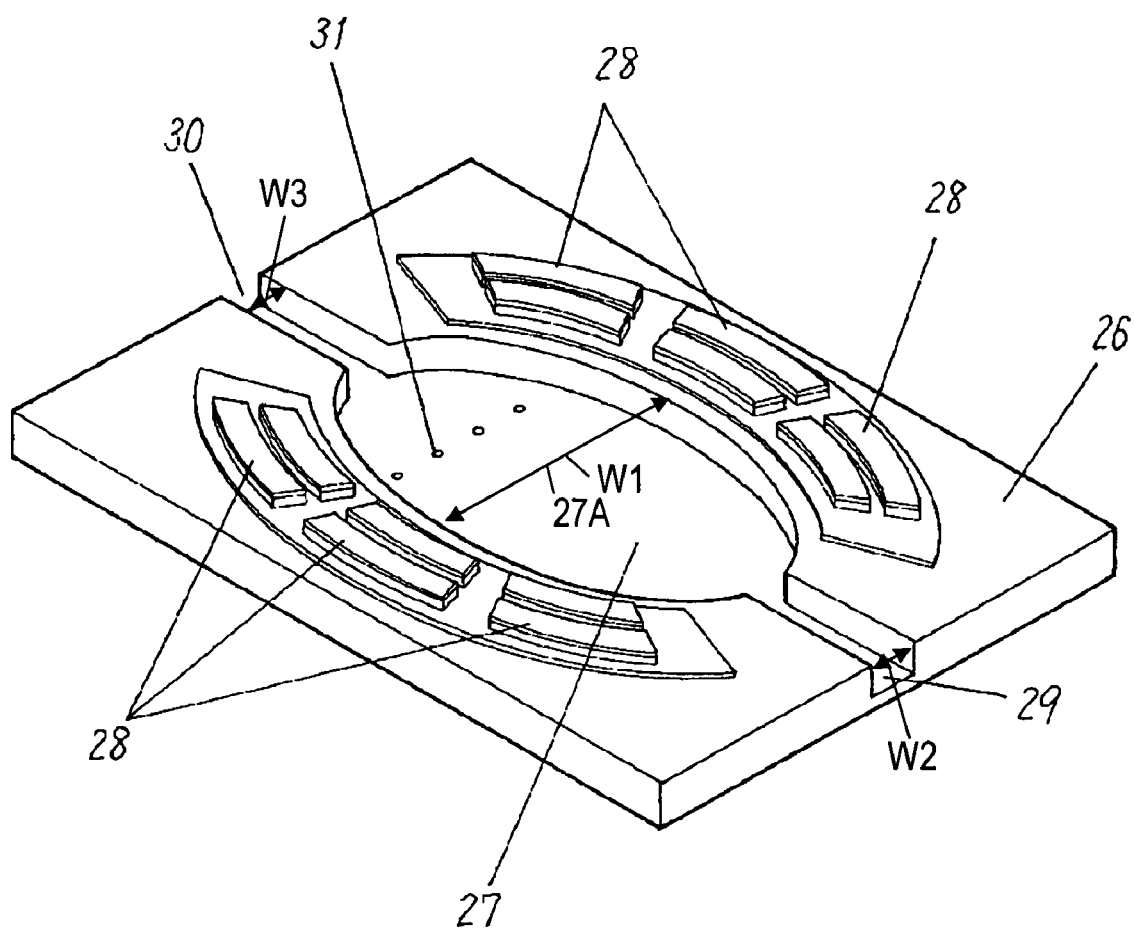
FIG. 13 is a perspective view of a component separation device according to Exemplary Embodiment 2 of the invention.

FIG. 13 is a perspective view of a component separation device according to Exemplary Embodiment 2 of the present invention. In this device, flow path 27 formed in substrate 26 made of silicon has a width increasing monotonically from inlet port 29 and decreasing monotonically from a portion having maximum width W1 toward outlet port 30. Maximum width W1 of portion 27A of flow path 27 is larger than width W1 and width W2 of inlet port 29 and outlet port 30, respectively. Plural actuators 28 are provided around flow path 27. Actuators 28 apply various vibrations to flow path 27 having wide width W1 as to generate standing waves, thereby separating components variously. Actuators 28 can be installed easily around flow path 27 having the large width, hence separating the components efficiently.

Figure 14:
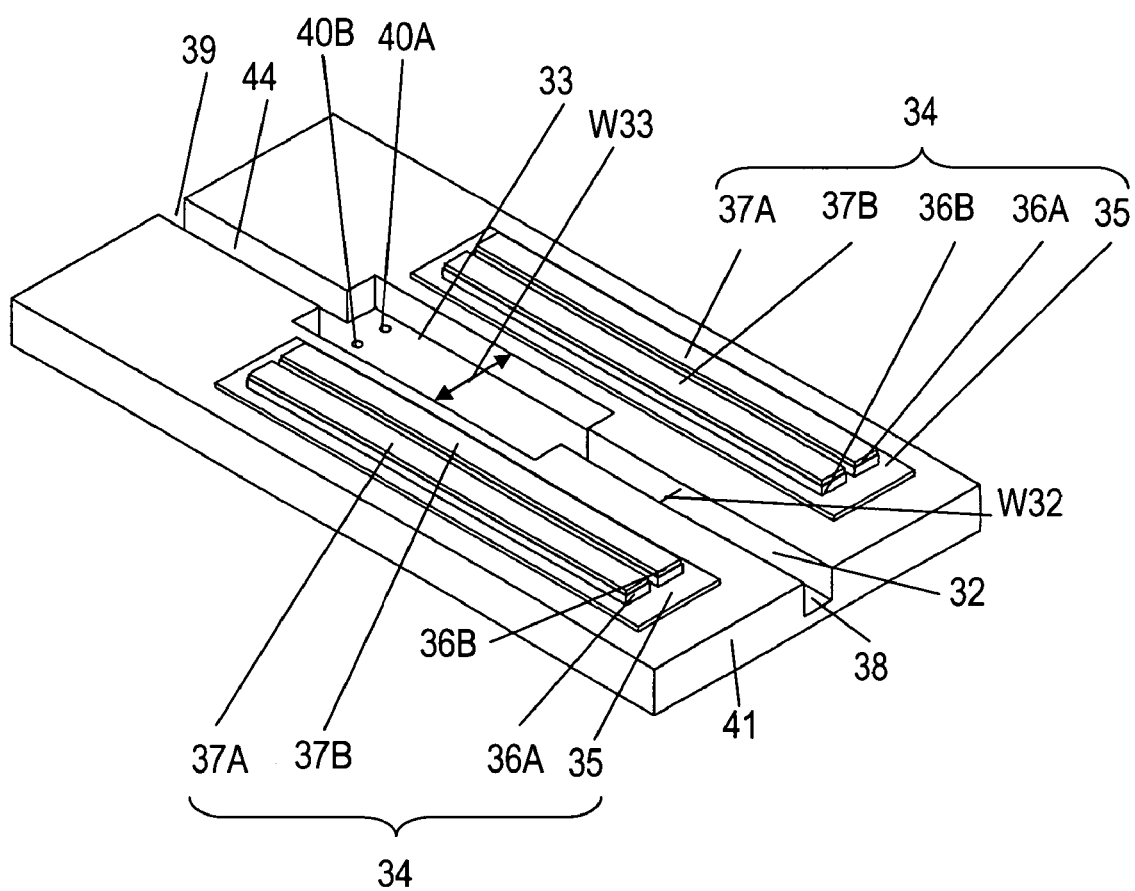
FIG. 14 is a perspective view of another component separation device according to Embodiment 2.
Figure 15:
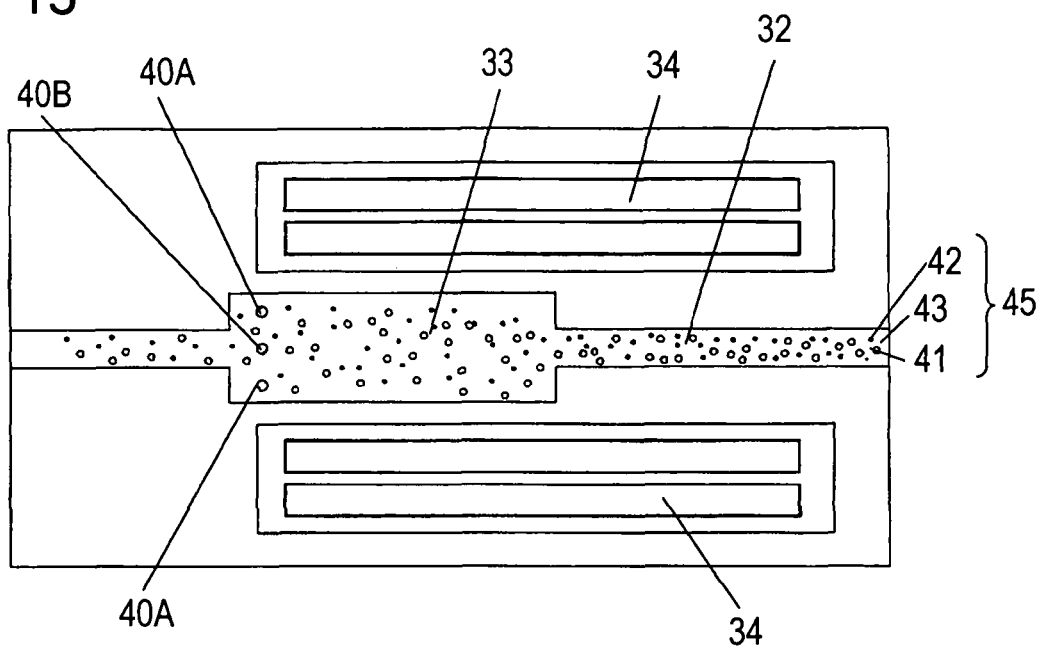
FIG. 15 is a top view of the component separation device shown in FIG. 14.
Figure 16:
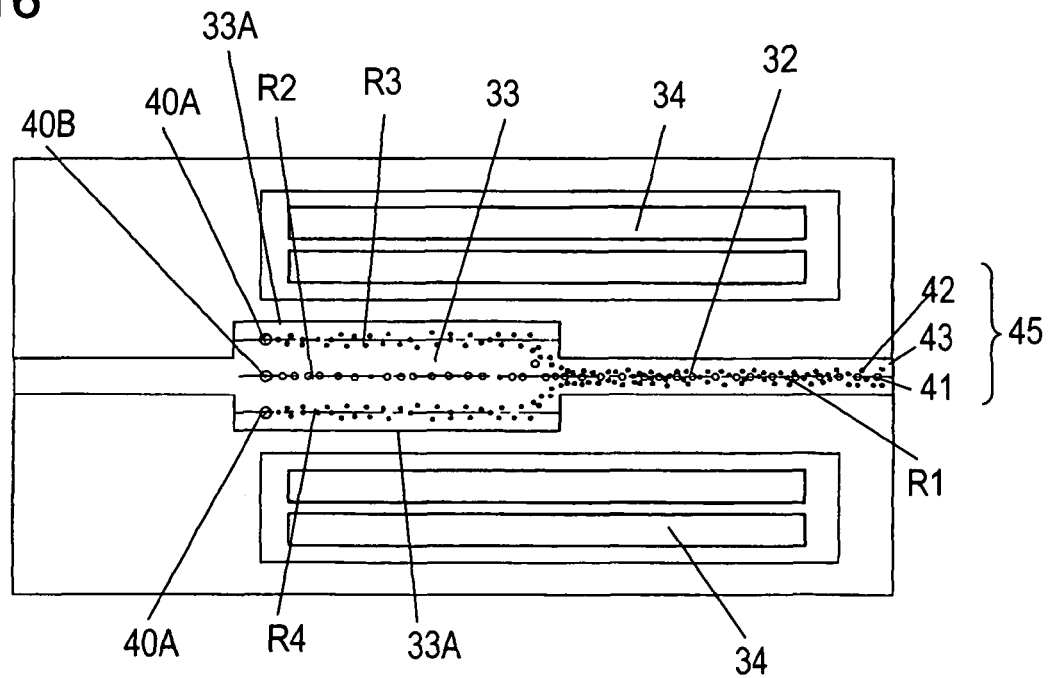
FIG. 16 is a top view of the component separation device shown in FIG. 14.

FIG. 14 is a perspective view of another component separation device according to Embodiment 2. FIGS. 15 and 16 are top views of the component separation device shown in FIG. 14. Substrate 31 is provided with flow path 32 connected to inlet port 38, flow path 44 connected to outlet port 39, and flow path 33 between flow path 32 and flow path 44 formed therein. Width W32 of flow path 32 is smaller than width W33 of flow path 33. Width W33 of flow path 33 is three times width W32 of flow path 32. Actuators 34 are provided along both outsides of flow paths 32 and 33, respectively.

A method of separating the components using this component separation device will be described. When fluid 45 containing solid components 41 and 42 having different sizes from each other and liquid component 43 mixed therein is put in inlet port 32, solid components 41 and 42 are dispersed randomly regardless of their sizes, and fluid 45 flows, as shown in FIG. 15. Solid component 42 is smaller than solid component 41.

Actuators 34 apply a vibration having a wavelength twice width W32 of flow path 32 to fluid 45 of flow path 32. A standing wave of the vibration at a basic mode of width W32 is generated in flow path 32, and forms single region R1 in which solid components 41 and 42 flow intensively is formed in parallel with flow path 32, as shown in FIG. 16.

Since extending to both outsides of flow path 33, actuators 34 generates a standing wave of the vibration in flow path 33, and the standing wave has a wavelength identical to that in flow path 32. Since width W33 of flow path 33 is three times the width W32 of flow path 32, a standing wave of a three-time mode in a width W33 is generated in flow path 33. As shown in FIG. 16, three regions R2, R3, and R4 in which stationary components 41 and 42 flow intensively are formed in parallel with flow path 33.

A solid component having a small size and a solid component having a low density can hardly be affected by standing waves. Therefore, small solid component 42 out of solid components 41 and 42 concentrating at region R1 in flow path 32 is dispersed more than solid component 41 in region R1 in flow path 32, as shown in FIG. 16. In flow path 33, regions R1 and R3 are closer to walls 33A of flow path 33 than region R2, and hence, solid component 42 flowed from flow path 32 concentrates more intensively at regions R3 and R4 than at region R2. In other words, the region of concentrated flow can be controlled by the sizes or density of solid components, and different solid components can be separated efficiently from the liquid component. Solid components 41 and 42 and liquid component 43 can be taken out from through-holes 40A and 40B and flow path 44 similarly to the component separation device of Embodiment 1 shown in FIG. 1.

In the device shown in FIG. 14, since width W33 of flow path 33 is tree times width W32 of flow path 32, the standing wave of basic mode is generated in flow path 32, and the standing wave of three-time mode is generated in flow path 33 by the vibration generated by actuator 34, thereby forming regions R1 to R4 in which solid components flow intensively. Alternatively, actuators different from each other may be provided at the outside of the flow paths 32 and 33, respectively, to generate vibrations having wavelengths different from each other. Then, width W33 of flow path 33 may not be three times width W32 of flow path 32. In the device according to Embodiment 2 shown in FIG. 14, it is not necessary to provide actuators different from each other on the outside of flow paths 33 and 32, and hence the component separation device can be manufactured and used easily.

In the device shown in FIG. 14, actuators 34 are provided on both sides of flow paths 33 and 34, respectively. The number of actuators 34 is not limited to it, and may be any number as long as it can apply appropriate vibrations.

In the device shown in FIG. 14 according to Embodiment 2, actuator 34 includes common electrode 35 on substrate 31, piezoelectric members 36A, 36B on common electrode 35, drive electrodes 37A and 37B on piezoelectric members 36A and 36B, and can be driven similarly to actuator 3 of Embodiment 1.

INDUSTRIAL APPLICABILITY

A component separation device according to the present invention can separate efficiently components in fluid containing liquid component and solid component mixed therein, such as blood or emulsion.

The invention claimed is:

1. A component separation device comprising: A substrate having a first surface and a second surface opposite to the first surface, the substrate having a flow path formed in the first surface, the flow path being arranged to store a fluid containing a liquid component and a solid component; an actuator causing the fluid stored in the flow path to vibrate, the actuator including a first electrode provided on the substrate apart from the flow path, and a first piezoelectric member provided on the first electrode, and a second electrode provided on the first piezoelectric member; and an outlet corresponding to a through-hole formed in a bottom surface of the flow path, wherein the outlet is configured to take out only the liquid component or take out substantially only the solid component in the fluid therefrom, wherein the substrate has an inlet port and an outlet port formed therein, the inlet port being connected to the flow path for providing the fluid into the flow path, the outlet port being provided at the end of the flow path for discharging the fluid from the flow path, and wherein said outlet and said outlet port are distinct and separate elements wherein the fluid containing the liquid component and the solid component flow out from the outlet port, and wherein said one of the liquid component and the solid component taken out of said flow path by said outlet does not reach said outlet port.

2. The component separation according to claim 1, wherein the first electrode of the actuator is provided on the first surface of the substrate.

3. The component separation device according to claim 1, wherein the first electrode of the actuator is provided on the second surface of the substrate.

4. The component separation device according to claim 1, wherein the actuator generates a standing wave in the fluid stored in the flow path.

5. The component separation device according to claim 1, wherein the actuator further includes
a second piezoelectric member provided on the first electrode, and
a third electrode provided on the second piezoelectric member.

6. The component separation device according to claim 5, wherein the first electrode of the actuator comprises at least one of gold, chrome, titan, and platinum,
wherein the second electrode of the actuator comprises at least one of gold, chrome, titan, and platinum,
wherein the third electrode of the actuator comprises at least one of gold, chrome, titan, and platinum, and
wherein the first piezoelectric member and the second piezoelectric member comprise titanic acid zirconate.

7. The component separation device according to claim 1, wherein the flow path has a portion having a width larger than a width of the inlet port and a width of the outlet port.

8. The component separation device according to claim 7, wherein the width of the flow path increases monotonically from the inlet port to the portion, and decreases monotonically from the portion to the outlet port.

9. The component separation device according to claim 5, wherein the flow path has a side surface communicating with the first surface of the substrate, and
wherein each of the first electrode, the second electrode, and the first piezoelectric member of the actuator has a longitudinal direction extending in parallel with the side surface of the flow path.

10. The component separation device of claim 1, wherein the through-hole is formed from the flow path to the second surface of the substrate.

11. The component separation device according to claim 1, wherein the substrate comprises silicon.

12. The component separation device according to claim 5, wherein the first electrode of the actuator comprises at least one of gold, chrome, titan, and platinum;
wherein the second electrode of the actuator comprises at least one of gold, chrome, titan, and platinum; and
wherein the first piezoelectric member comprises titanic acid zirconate.

13. The component separation device according to claim 10, wherein the substrate has an additional through-hole formed from the flow path to the second surface of the substrate, and the outlet comprising the additional through-hole.

14. A component separation device comprising: a substrate having a first surface and a second surface opposite to the first surface, the substrate having a flow path formed in the first surface, the flow path being arranged to store a fluid containing a liquid component and a solid component, said substrate having an inlet port and an outlet port connected to said flow path; an actuator causing the fluid stored in the flow path to vibrate, the actuator including: a first electrode provided on the substrate apart from the flow path, and a first piezoelectric member provided on the first electrode, and a second electrode provided on the first piezoelectric member; and an outlet corresponding to a through-hole formed in a bottom surface of the flow path, wherein the outlet is configured to take out only the liquid component or take out substantially only the solid component in the fluid therefrom, wherein the substrate has a plurality of through-holes formed in the bottom surface of the flow path to the second surface of the substrate, and the outlet comprising a plurality of said through-holes wherein said one of the liquid component and the solid component taken out of said flow path by said outlet does not reach said outlet port.

15. The component separation device according to claim 14, wherein the inlet port is connected to the flow path for providing the fluid into the flow path, and the outlet port is provided at the end of the flow path for discharging the fluid from the flow path.

* * * * *